Sept. 3, 1935.  H. G. WEISS  2,013,021
AUTOMATIC CHANGE-OVER DEVICE
Filed May 6, 1932  4 Sheets-Sheet 1

INVENTOR
Henry G. Weiss
BY Murray y Zugelter
ATTORNEYS

Fig. 2.

Sept. 3, 1935.  H. G. WEISS  2,013,021
AUTOMATIC CHANGE-OVER DEVICE
Filed May 6, 1932    4 Sheets-Sheet 3

INVENTOR
Henry G. Weiss
BY
Murray Zugalter
ATTORNEYS

Sept. 3, 1935.  H. G. WEISS  2,013,021
AUTOMATIC CHANGE-OVER DEVICE
Filed May 6, 1932  4 Sheets-Sheet 4

Inventor
Henry G. Weiss

Fig. 7.

By Murray and Zugelter
Attorneys.

Patented Sept. 3, 1935

2,013,021

UNITED STATES PATENT OFFICE 2,013,021

AUTOMATIC CHANGE-OVER DEVICE

Henry G. Weiss, Cincinnati, Ohio, assignor to The Automatic Control Turnover Company, Cincinnati, Ohio, a corporation of Ohio Application May 6, 1932, Serial No. 609,696

7 Claims. (Cl. 88—17)

This invention relates to an automatic change-over device for motion picture projecting machines, whereby the operator is relieved of all duties concerning actual operation of the machines with the exception of placing and removing the films.

An object of the invention is to provide means associated and arranged in such a manner as to render motion picture projecting entirely automatic, with change-overs from one machine to another accomplished in a highly satisfactory manner so that continuous performance is unattended by perceptibility of the change-over.

Another object is to provide a motion picture change-over device which will operate without undesirable interference with the operation of the sound-producing apparatus commonly used in connection with picture projection.

A further object of the invention is to provide novel and improved means for effecting the change-over from one picture projecting machine to another, without resorting to the use of markings or indentations or actual contact upon the film itself.

Another object is to provide an automatic picture projecting apparatus of the character above set forth, including automatic means for completely disabling the projector temporarily in the event of film breakage, so as to preclude mutilation of the film and the possibility of ignition thereof by the rays of the projector lamp.

More specifically, an object of the invention is to provide means, operating automatically as a picture film in one projection machine is unwound from its reel, to initiate operation of a second projection machine by energizing its projector light, starting its film advancing motor, and then withdrawing the shutter of the second machine simultaneously with the closing of the shutter of the first machine and the shifting of the sound projection means, subsequent to which operations the motor and projection light of the first machine are automatically de-energized. The second machine thereupon projects its reel of film, and as the film unwinds and nears its end or "trailing portion", the first machine is again automatically placed in operation, by the means of the invention, for projection of a third reel of picture film. The shifting from one machine to another thereby is rendered entirely automatic and the operator is required only to replace the film reel of one machine while the other machine is in operation.

In addition to the foregoing, certain mechanism is interrelated and associated with the apparatus, to provide for promptly extinguishing the illuminator or arc and stopping the driving motor to prevent film destruction in the event of breakage of the film during projection.

These and other objects are attained by the means described herein and disclosed in the accompanying drawings, in which.

Figure 1:
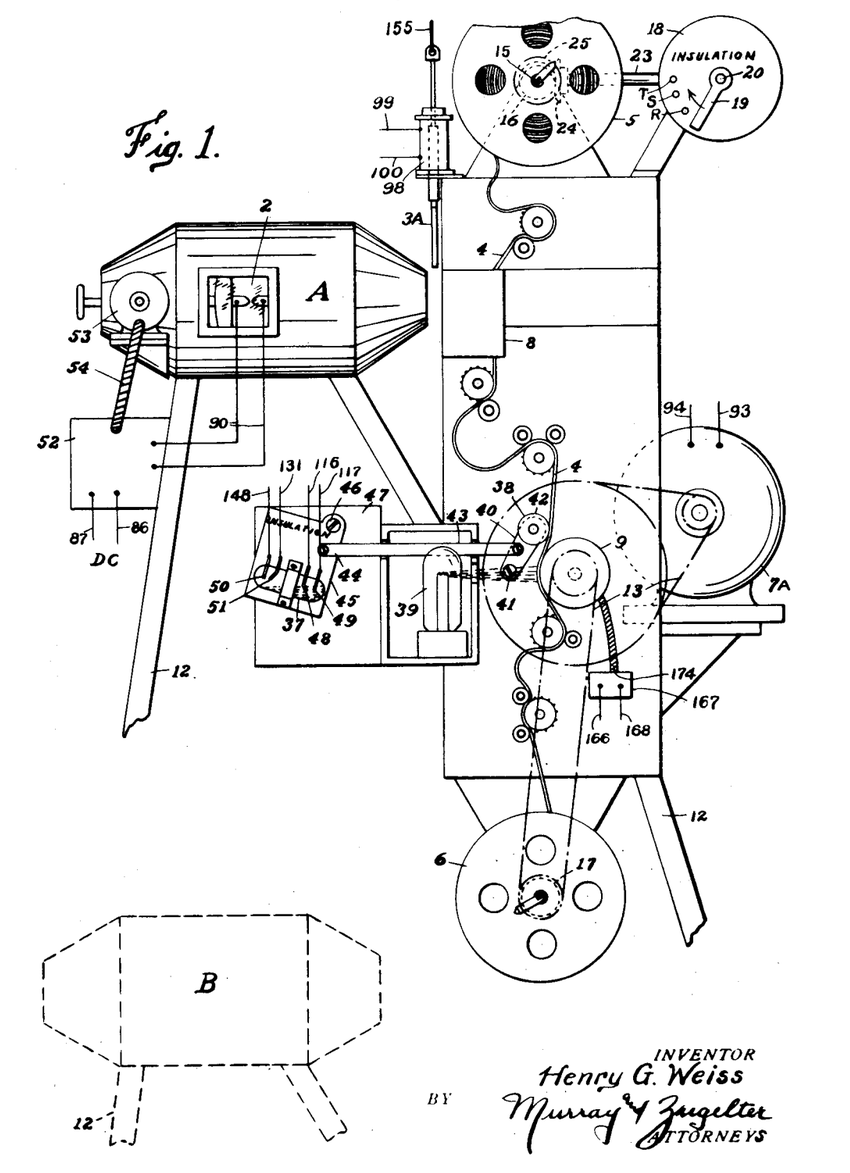
Fig. 1 is a side elevational view showing two identical motion picture projecting machines A and B embodying the invention, one of the machines being illustrated in detail and the other being shown conventionally.

In the respective picture projection machines indicated at A and B, 2 represents the illuminator or arc in a suitable casing; 3 is a shutter that may be interposed between the illuminator and the picture film 4; 5 is the reel from which the film is unwound; 6 is the receiving reel onto which the film is wound during projection of the picture; 7 is the motor for driving the receiving reel; 8 is the lens element of the machine; 9 is a device for initiating and controlling sound emitted simultaneously with projection of the picture; and 10 indicates a speaker or amplifier electrically connected with the device 9 of each machine. Each machine may be supported upon a suitable under structure 12, which may also support the motor 7, which motor may be caused to drive the receiving reel 6 by means of a belt or chain arrangement 13.

The foregoing elements and the arrangement as disclosed in Fig. 1, are old and well known in the art, wherefore it is considered unnecessary to describe in detail the function of said elements.

In accordance with the instant invention, the following cooperative relationship exists between the two machines indicated at A and B. Assuming that machine A is in operation, as indicated in Fig. 1 of the drawings, it is readily understood that its driven reel 6 is constantly receiving film from the reel 5, and the pictures of said reel are being projected because of the fact that shutter 3 of machine A is withdrawn and the illuminator 2 is in operation. Heretofore, it was necessary for one operator to stop and render inoperative the machine A, when the reel 5 became exhausted, while at the same time a second operator placed in operation the machine B which carried the next reel of film. It was necessary also for one of the operators to effect a change over of the sound mechanism from machine A to machine B simultaneously with the stopping of machine A and the starting of machine B. By means of the herein described invention, however, the machine A, which is in operation, automatically energizes the illuminator and the motor of machine B as the film of machine A nears the end or trailing portion, and, at a proper time, simultaneously opens the shutter of machine B, closes the shutter of machine A, and throws an electrical switch 14 which places the speaker or amplifier 10 in condition to operate from the sound initiating device 9 of machine B. The means of the invention serves also to render completely inoperative machine A, by breaking the electrical circuit of its illuminator 2 and motor 7. Therefore while the machine B is in operation an operator may remove the film that was displayed by machine A and replace said film with a reel intended for projection after display of the film on machine B. As the film of machine B reaches the end of its travel, the mechanism of the invention operates to start the machine A as the machine B is rendered inoperative. From the foregoing it should be clearly understood that the machines will automatically operate alternately without the intervention of an operator except for replacement of reels of film in the idle machine.

Of considerable importance to this invention is the fact that the reel 5, and its central shaft or axle 15, gain speed of rotation as the film is payed out and wound onto the receiving reel 6, this being due to the gradual increase in diameter of the hub of reel 6 and the gradual decrease in diameter of the hub of reel 5 as the film is transferred. The hub of reel 5 is indicated at 16, and that of reel 6 is indicated at 17. This change in axle or reel speed is utilized for effecting the change-over from one machine to the other, because the hubs of all reels are of uniform diameter and consequently the last rotations of all paying reels 5 are of a definite or expected speed regardless of the length of film carried by such reels. The speeds of rotation of the shafts 15, therefore, may be relied upon for actuating a mechanism to automatically stop one machine and start the other machine simultaneously and with great precision at a predetermined time.

The automatic start and stop means may include a device operating on the principle of a tachometer, and described as follows. At 18 is indicated a stationary electrical contact supporting board, which, if desired, may be in the form of a plate or disc. Extending through the opening in the board 18, which is preferably of insulated material, is a shaft 20, upon which is fixedly mounted a contact bar 19. The free end of the contact bar, upon rotation of the shaft 20, will engage various electrical terminals supported upon the plate 18, for the purpose of closing certain electrical circuits. The main shaft 23 of the device of Fig. 4 may be provided with any suitable means, a gear 24 being shown, for transmitting motion from the reel supporting shaft 15 to the main shaft 23 of the device. Gear 24 may engage a gear 25 fixed on the reel supporting shaft. Obviously, a belt or chain drive could be substituted for the gear drive just described.

On the main shaft 23 (Fig. 4) is mounted a governor device which may be of any suitable design, that shown comprising a pair of weights 26 pivoted to links 27 the free ends of which links are pivoted at 28, upon a cross bar 29 fixed to shaft 23, and at 30 upon a cross bar 31 slidable on shaft 23. As the main shaft is rotated the weights will extend themselves laterally, thereby causing the grooved collar 32 which is fixed to cross bar 31 to move longitudinally of the shaft. The amount of longitudinal movement of the collar is determined by the speed of rotation of shaft 23 and its effect upon the weights 26.

Figure 4:
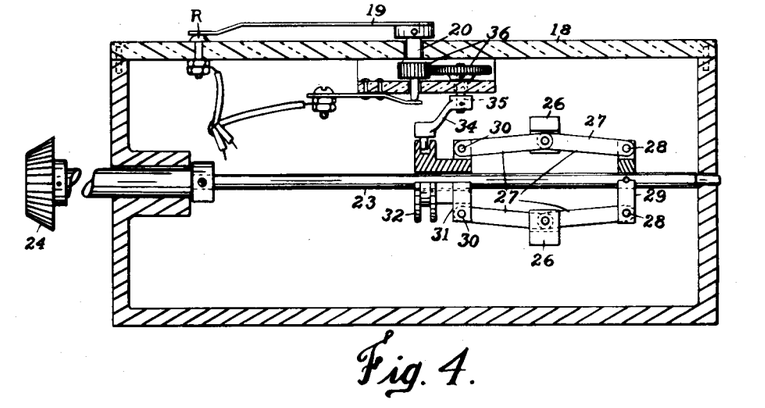
Fig. 4 is a cross-sectional view of an automatic contactor which controls operation of the change-over mechanisms.

The grooved collar receives one end 33 of a crank 34 which crank is fixedly mounted on a shaft 35 journalled in suitable bearing means. Said shaft might of itself, support the contact bar 19, but in order to gain increased movement of the contact bar through a circular arc, there may be provided the gearing 36 between the shafts 35 and 20.

From the foregoing, it should be clearly understood that by gradually increasing the speed of rotation of the shaft 23, the contact arm or bar 19 will be moved comparatively slowly through an arc of a circle, so that the free end of the metallic contact arm may successively contact the electrical terminals which are arranged on the stationary plate 18. The contact arm 19 may be moved in a clockwise direction of rotation, as indicated by the arrow in Fig. 1. It is to be understood that other forms of tachometer or speedometer devices may be employed for moving the arm 19, wherefore the invention is not to be restricted to the use of the specific device illustrated and described.

As is most clearly shown in Fig. 1, the machine is provided with a safety device the function of which is to stop the machine and extinguish the arc or illuminator upon breakage of the film during projection. The safety device comprises a switch, indicated generally by the character 37, which has a mechanical connection with a follower 38 that normally rides upon the film and serves also to hold the film in contact with the drum 9 of the photo-electric sound producing unit. The drum 9 and its association with the photo-electric mechanism and the exciter lamp 39, is well known in the art and therefore need not be described in detail herein for a clear understanding of the present invention.

It is to be observed that the follower 38 comprises an arm 40 which is pivoted at 41 upon a stationary part of the machine, the end of the arm opposite the pivot being provided with an anti-friction roller 42 which bears upon the film and urges it toward the drum. Intermediate the ends of the arm is pivoted a connecting member 43 the end 44 of which has a pivotal connection with a rockable or tiltable plate or support 45 which carries the switch means 37. The plate 45 is pivoted, as at 46, to a stationary part 47 of the machine frame, so that upon movement of the rod 43 to the right the switch 37 will be actuated to break an electrical circuit through the switch terminals 48 and 49 and complete an electrical circuit through the switch terminals 50 and 51. Said actuation of the switch 37 effects a complete disabling of the machine to which it is attached, as will become apparent as the description proceeds. Obviously, the above stated movement of the member 43 to the right, results when the film 4 breaks and thereby permits the roller to strike the drum 9. The roller may be constantly urged toward the drum by gravity or by a light spring, not shown. Although other forms of switches 37 may be employed, only one type is shown, this being a mercury contact switch comprising a glass or other suitable bulb containing a suitable fluid conductor such as mercury. In threading the film into the machine, the roller 42 is caused to assume the relationship shown in Fig. 1 in which the roller is spaced from the drum. It may be stated that the element 40—41—42 is not necessarily an added part, but is found on the machine as part of its equipment; hence it will be understood that other or equivalent followers may be utilized to provide an actuator for the switch 37. Each of the machines A and B is equipped with a switch mechanism as above set forth, as is evident from Fig. 2.

It is considered preferable, though not absolutely necessary, to provide each machine with an automatic arc regulating device which may be of any suitable or acceptable construction, such as is disclosed in the patents of N. S. Keith #257,588 and C. M. Fox #1,622,505, or in my copending application Serial Number 593,496, filed February 17, 1932. The arc regulating device is indicated herein by the characters 52—53, the operating motor thereof being represented at 53 and the remaining mechanism (see Figs. 5 and 6) being housed within the casing 52. The character 54 (Fig. 2) indicates a cable which contains the necessary wiring for parts 52 and 53. Electrical current is supplied to the arc light and associated mechanisms, by a generator or other suitable source of electricity 55, as will be explained presently.

Figure 2:
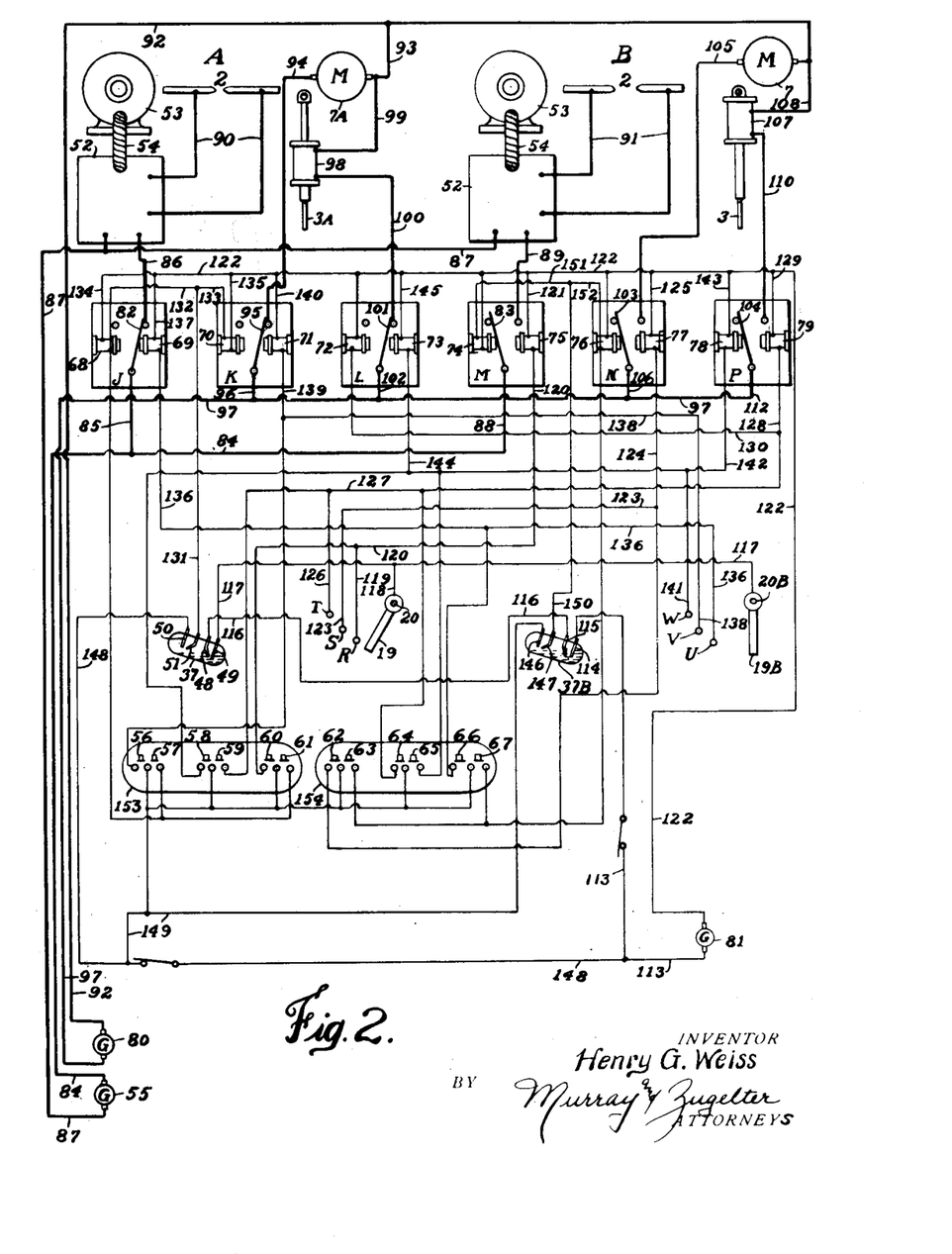
Fig. 2 is a wiring diagram showing the electrical connections between the various means employed in carrying out the invention.

By reference to Fig. 2 it will be seen that the system includes a series of momentary contact switches 56 to 67 inclusive which are electrically associated with certain electro-magnetic coils on a series of contactors or switches 68 to 79 inclusive, in such manner as to break and close various electrical circuits in which the contactors are included. When the operator desires to initially begin the exhibition of pictures, he is required to depress the momentary contact switches 56, 58 and 60, which serve to actuate the arc, the driving-motor, and the shutter or douser of machine A, which, as shown in Fig. 2, is in actual operation. The source of current for the arc or illuminator is indicated at 55, this being preferably a generator furnishing direct current. The generator 80 furnishes alternating current for operating the motor and dousers, and the generator 81 may be utilized for supplying either direct or alternating current for actuating the various contactors.

The contactors J and M serve to control operation of the arcs of machines A and B, respectively. Contactor J comprises the opposed electro-magnets 68 and 69, each of which may act for moving a pivoted switch blade 82 to open and closed circuit positions. Similarly, contactor M comprises the electro-magnets 74 and 75 which may act upon the switch blade 83 in a like manner. With the switch blades in the positions shown in Fig. 2, the current from the generator 55 is supplied to the arc regulating device 52 by means of the conductors 84, 85, 82, 86, and 87 (Fig. 2). Inasmuch as the switch blade 83 is in the open position, no current may flow to the arc regulating device 52 of machine B; however, by effecting energization of the coils 68 and 75, the switch blades are moved so that blade 82 assumes an open position, whereas blade 83 assumes a closed position for completing the electrical circuit comprising conductors 84, 88, 83, 89, and 87. The arc of machine B thereby is energized while at the same time the arc of machine A is de-energized. It will be understood that the leads 90 and 91 supply current to the carbons of machines A and B, respectively.

While the arc of machine A is in operation, the motor 7A of said machine is running by reason of the electricity supplied by the generator 80 through the conductors 92, 93, 94, switch blade 95, conductor 96, and the conductor 97 which is a return wire common to the switch blades of contactors K, L, N, and P. It will be noted, also, that the solenoid 98 of machine A, which maintains the shutter 3A in a raised or open position, is energized by means of the closed electrical circuit comprising the conductors 92, 93, 99, 98, 100, switch blade 101, conductor 102, and common return wire 97. By shifting the switch blades 95 and 101 to an open circuit position, by means of electro-magnets 70 and 72, respectively, the circuits of the motor 7A and solenoid 98 may be broken. Upon moving the switch arms 103 and 104 to a closed circuit position, by means of magnets 77 and 79, respectively, electrical circuits may be closed to effect operation of the motor and douser or shutter of machine B. The circuit of the motor of machine B would include the conductors 92, 105, switch blade 103, conductor 106, and common return wire 97. The circuit of the solenoid 107 of the machine B douser would include the conductors 92, 108, 107, 110, switch arm 104, conductor 112, and the common return wire 97.

From the foregoing it should be evident that, as the machines are to operate alternately, the switch blades of contactors K and L are closed whenever the switch blades of contactors N and P are open, and vice versa. Also, when switch 82 of contactor J is closed, the switch 83 of contactor M is open, and vice versa.

As stated before, machine A, according to the wiring diagram of Fig. 2, is in operation and machine B is in condition to operate, the film thereof being threaded over the various sprockets and reels 5 and 6. As machine A nears the end of its projecting period, the governor arm 19 reaches and makes contact with the terminal R of the automatic change-over mechanism, so as to complete a circuit for energizing the arc 2 of machine B. The circuit thereby completed includes the generator 81, conductor 113, contacts 114 and 115 of switch 37B, conductor 116, terminals 48 and 49 of switch 37 contactor 117, and 118, governor arm 19, and terminal R, conductors 119, and 120, magnet 75, conductor 121, and common return wire 122 to the generator 81. By thereby energizing the magnet 75 and closing the switch 83, current is caused to flow to the arc 2 of machine B through the arc regulating device 52 thereof as herein before set forth, the switch 82 of contactor J remaining closed because machine A is still projecting.

Further advancement of the governor arm 19 effects closing of a circuit from 118 to S, which starts the motor of machine B by completing an electrical circuit including the generator 81, conductors 113, 114, 115, 116, 48, 49, 117, 118, 19, S, 123, 124, coil 77, conductor 125, and common return wire 122 to the generator 81. Energizing of electro-magnet 77 closed the switch 103 for supplying electrical energy to the motor 7 of machine B, as above described. It will be noted that the motor switch 95 of machine A remains closed because the machine A still is projecting.

When the governor contactor advances sufficiently to afford an electrical connection between conductors 118 and T, a circuit is closed for opening or elevating the shutter 3 of machine B and simultaneously closing or releasing the shutter 3A of machine A, so that machine B will project in place of machine A. The circuit completed by reason of the governor arm 19 striking the contact or terminal T, includes the generator 81, conductors 113, 114, 115, 116, 48, 49, 117, 118, 19, T, 126, 127, 128, coil 79, conductor 129, and common return wire 122 to the generator 81. It will be noted that conductor 127 supplies current also to a conductor 130, which in turn energizes the magnet 72 of contactor L for moving the switch blade 101 to an open position while the magnet 79 moves switch 104 of contactor P to the closed position, thereby permitting the shutter 3A to drop as the shutter 3 of machine B is raised or moved to the open position.

The next step in the series is to effect automatic stopping of machine A, since machine B now is in operation. Machine A is stopped by reason of tilting of the mercury switch 37 (see Fig. 1) as the trailing portion of the film from reel 5 reaches the roller 42 of the automatic cut-off means. Movement of the extreme end or trailing portion of film 4 past the roller 42 is equivalent to the film breakage, wherefore the roller or follower 42 moves forwardly to strike the photoelectric cell drum 9 and thereby moves the switch mechanism 45 about its pivot 46 for tilting the tube 37 rearwardly. The effect of rearwardly tilting said switch is to cause completion of an electrical circuit comprising the generator 81, conductors 113, 148, 50, 51, 131, and conductors 132 and 133 which lead to coils 68 and 70, respectively, which have connection by means of wires 134 and 135, with the return wire 122 of the generator. The electrical circuit thereby completed through the coils 68 and 70 causes movement of the switches 82 and 95 to an open position, whereby the arc and motor circuits of machine A are opened. Obviously then, machine A stops and after removal of the exhibited film, it may be rethreaded with a film to follow the projection of machine B. It will be understood that stopping of machine A will cause the governor arm 19 of said machine to move to an initial position in advance of the change-over contacts, R, S and T, and as the machine A is re-threaded with film, the mercury contactor 37 will be moved back to the position indicated in Figs. 1 and 2.

In a manner similar to that described in connection with machine A, the machine B will operate, toward the end of its projection period, to start the machine A. The starting of machine A is begun when the governor contactor 19B moves into position for making electrical contact with the terminal U, whereby to complete the circuit including the generator 81, conductors 113, 114, 115, 116, 48, 49, 117, 19B, U, 136, coil 69 of contactor J, conductor 137, and the common return wire 122 to generator 81. By thus energizing the coil 69 the switch 82 is closed for completing the arc circuit of machine A, which circuit comprises the generator 55, conductors 84, 85, 82, 86, 52, and 87. As the governor contact 19B reaches the terminal V, there is completed a circuit for starting the motor 7A of machine A. This circuit being from generator 81 through conductors 113, 114, 115, 116, 48, 49, 117, 19B, 138, 139, coil 71, and conductor 140 which is electrically connected to return wire 122 of the generator 81. By thus energizing the coil 71, the switch arm 95 is attracted so as to close the circuit of the motor 7A as herein before described.

Further advancement of the governor contact member 19B to a position upon terminal W of the change-over device, closes a circuit whereby there is effected an actuation of the douser or shutter mechanism that permits machine A to project its film, while at the same time machine B is precluded from projecting, due to lowering or closing of the shutter 3. The circuit last mentioned includes the generator 81, conductors 113, 114, 115, 116, 48, 49, 117, 19B, W, 141, 142, coil 78, and conductor 143, which has electrical connection with the generator return wire 122. By thus energizing the coil 78, the switch 104 is moved to the open position, whereby to break the circuit of the solenoid 197 of machine B while the solenoid 98 of machine A becomes energized due to passage of current from the live wire 142 through the conductor 144, coil 73, conductor 145, and return wire 122.

Machine B being in operation, the next step is to stop machine A by de-energizing its arc and motor, this being accomplished by tilting of mercury contactor 37B in exactly the same manner as was described in connection with the mercury contactor 37 of machine A. The tilting of contactor 37B effects a mercury connection between the contacts 146 and 147 thereof, whereby current may flow from generator 81 through conductors 113, 148, 149, 146, 147, 150, and conductors 151 and 152 which lead to coils 74 and 76, respectively, each of which has a return wire to the common conductor 122 of generator 81. It will be noted that energization of coil 74 caused an opening of the switch 83, which controls flow of electricity to the arc of machine B, and that energization of coil 76 opened the switch 103, which controls flow of electricity to the motor 7 of machine B. Machine B thereby is completely disabled due to movement of mercury switch 37B which was permitted to tilt when the trailing portion of the film in machine B left the safety device 40 thereof (see Fig. 1). After the machine has come to a stop, it may be re-threaded with film and placed in readiness for operation after the exhibition of the film contained in machine A.

The foregoing completes an explanation of sequence of operations concerning machines A and B.

The momentary contact push buttons 56 to 67 inclusive provide for manual control of the arc, motor, and douser mechanisms of the machines. When the button 56 is depressed, electrical current is supplied to the magnet 69 for energizing the arc of machine A. Depression of button 57 closes an electrical circuit through the coil 68 for opening the switch 82 and de-energizing the arc. Depression of switch button 58 effects energization of the coils 73, and 78, whereby the douser of machine A is opened and that of machine B is closed. Upon depressing the button 59, the coils 79 and 72 are energized for opening the douser of machine B, and closing the douser of machine A. When it is required to energize the arc of machine B, the button 60 is depressed, and when it is desired to stop the motor of machine A, the button 61 is depressed.

By closing the switch 62, the motor of machine B may be started manually; and to manually extinguish the arc of machine B the switch 63 is thereby closed momentarily.

By closing the switch 64, current is caused to flow through the coil 70 which attracts the switch blade 104 which in turn completes the electrical circuit through the solenoid 107 for opening the douser 3 of machine B; at the same time the coil 72 is energized for attracting the switch blade 101 of contactor L for opening the electrical circuit of the solenoid 98, whereby to permit lowering or closing of the douser 3A. Depression of the switch 65 causes energization of the coil 78 of contactor P, which effects retraction of the switch blade 104 to break the circuit of solenoid 107, while at the same time the coil 73 is energized for completing the circuit of solenoid 98 through switch blade 101.

When it is desired to manually or independently energize the arc of machine A, the switch 66 may be depressed for exciting the coil 69 in order to attract the switch blade 82 and move it to a closed position to complete the arc circuit of machine A. The momentary contact switch 67 is utilized for extinguishing the arc of machine B by exciting the coil 74 so as to move the switch blade A3 to an open position with respect to the arc circuit.

The characters 153 and 154 indicate panels upon which the various momentary contact switches 56 to 67 inclusive, are mounted. Attention is directed to the fact that the tiltable switches 37 and 37B of machines A and B, respectively, provide a safety means whereby the operator's hands are protected from injury while threading up either of the machines. As long as a machine has its follower 38 disposed forwardly against the drum 9 of the photo-electric cell mechanism, that machine cannot be started automatically when the other machine terminates its projection period. This should be readily understood by reference to a foregoing paragraph wherein an explanation was given as to how the rearward tilting of switch 37 or switch 37B breaks the arc and motor circuits of its associated machine. Thus it will be observed that the tiltable switches function as safety devices, as well as automatic cut-offs for the arc and motor circuits.

Figure 3:
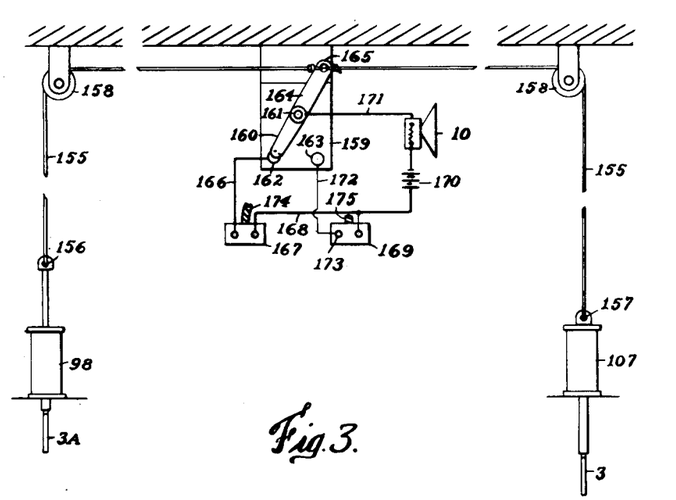
Fig. 3 is an elevational view showing a shutter or douser arrangement forming a detail of the invention.

From the disclosure of Fig. 3, it will be noted that the sound amplifying or speaker apparatus has connection with the douser mechanism such that actuation of the douser will effect a change-over of the speaker. A preferred form of means for accomplishing the above comprises a cord, cable or the like 155 the opposite ends of which may be connected to the cores of solenoids 98 and 107, as indicated at 156 and 157. The element 155 may pass over a pair of pulleys 158 which may be rotatably supported upon suitable brackets fastened to a wall or ceiling. The character 159 indicates the usual fader which contains a movable switch arm 160 of electricity conducting material that may be moved about its axis 161 to provide for selective engagement thereof with the terminals 162 and 163 of the fader. The axis 161 may have fixed thereto an extending arm 164 which is securely connected, as at 165 to a point on the cord or cable 155. From the foregoing, it should readily be understood that energization of the solenoid 98 will effect such movement of the connecting arm 164 as will throw the switch blade 160 into electrical connection with the contact 162.

The conductor 166 which leads from the contact 162 enters a pre-amplifying device 167, the interior construction of which is well known to those conversant with the art to which the invention appertains. A conductor 168 leaves the pre-amplifying device 167 of machine A, and straps over to the second pre-amplifying device 169 which has electrical connection with machine B. Conductor 168 extends to a source of potential 170 for the speaker 10, which is placed in series therewith, and a conductor 171 connects the speaker in series with the pre-amplifying device 167 by means of a connection to the shaft 161 which is electrically associated with the switch blade 160. From the terminal 163 of the fader switch, a conductor 172 is connected to the terminal 173 of the pre-amplifier 169, so that upon movement of the switch blade 160 to the terminals 162 and 163, the pre-amplifiers 167 and 169 may successively be placed in electrical association with the speaker 10 and the source of electricity 170. By means of the foregoing arrangement, the speaker is caused to function when the projecting machine has its shutter 3A disposed in an open or inoperative position; if the shutter 3A is conditioned to intercept the light rays of the illuminator, the speaker will be associated with the other shutter 3 which necessarily is in inoperative or open position and conversely, closing of the shutter 3 and opening of the other shutter 3A effects a change-over of the sound apparatus so that sound is produced by the operating machine, the shutter 3A of which is open or inoperative.

Inasmuch as the fader, the pre-amplifiers and the speaker or amplifying means 10 are devices well known in the art, it is considered unnecessary to further describe their details of construction. The multiple-wire cables 174 and 175 carry the necessary conductors for electrically associating the pre-amplifiers with the photo-electric apparatus which initiates production of sound during exhibition of the pictures.

Figures 5, 6, 7:
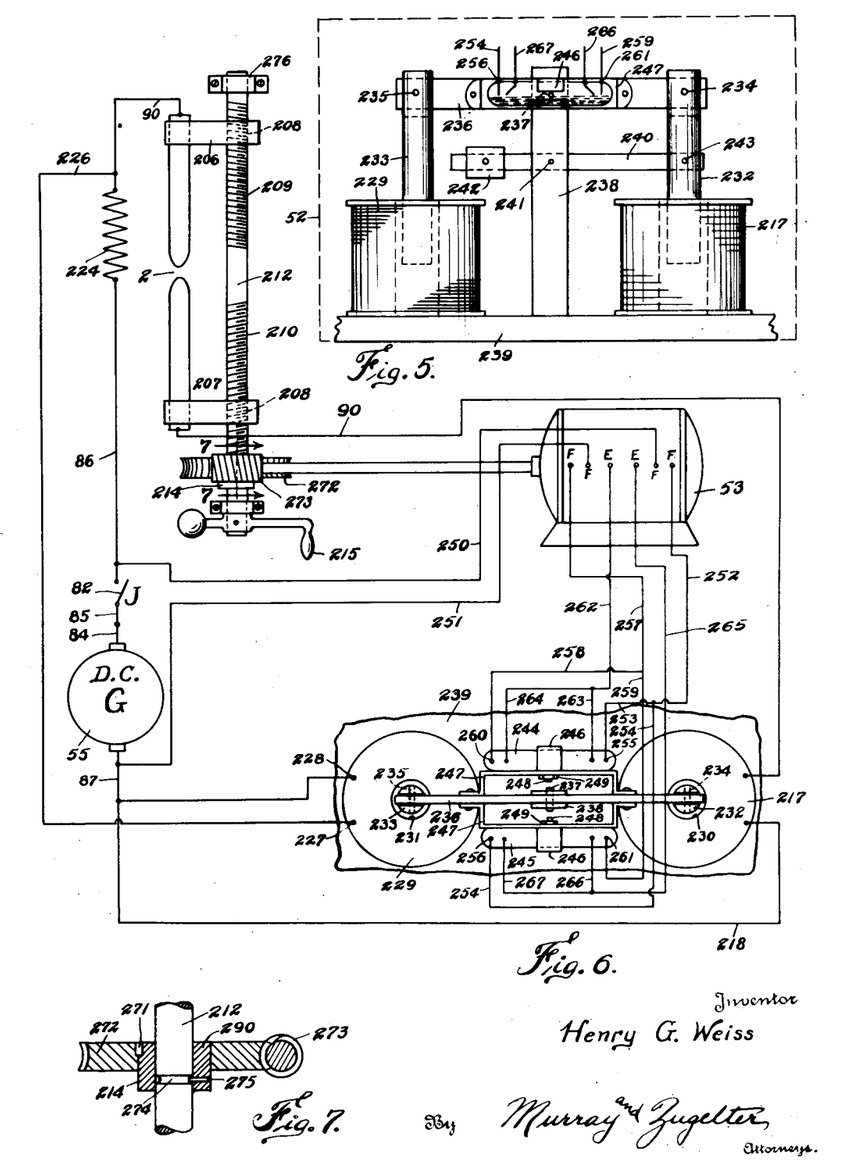
Fig. 5 is a front elevational view of an automatic arc starting and stabilizing device forming part of the invention.
Fig. 6 is a top plan view of the device disclosed in Fig. 5, and showing diagrammatically the device operatively connected with an arc light to be controlled thereby.
Fig. 7 is a cross-sectional view taken on line 7—7 of Fig. 6, showing one form of friction drive, that may be used in connection with the arc controlling device.

Attention is now directed to the disclosures of Figs. 5, 6 and 7 which show one form of means for automatically starting and stabilizing an arc light such as is indicated at 2 of Fig. 2. It is to be understood that one arc starting and stabilizing device may be associated with each machine, as hereinbefore explained, so that no manual adjustments are necessary during or intermediate the change-over operations.

In the drawings, 2 represents arcing or incandescent elements, which may be of carbon or other suitable material, said elements being mounted upon clips or supports 206 and 207, respectively. Each support includes a threaded bore 208 adapted for reception of the right and left hand screw threads 209 and 210, whereby upon rotation of the screw 212, the clips will be moved in opposite directions for adjusting the relative positions of the elements 2.

The screw 212 may be moved in opposite directions by means of the reversible motor 53. By providing a suitable friction clutch device 214 the screw may be rendered manually actuable by means of the handle 15, as will be more fully explained hereinafter.

Means are provided for effecting rotation of the motor 53 in one direction or the other, depending upon the variations in resistance in the electrical circuit which supplies electricity to the arcing elements. It should readily be apparent that as the arcing elements burn away, the distance between them is increased and this has the effect of adding to the resistance of the electrical circuit including the arcing elements. The principal circuit of the arcing elements comprises the conductor 90, coil or solenoid 217, conductors 218 and 87, direct-current generator 55, conductors 84 and 85, switch 82, conductor 86, resistance 224, and conductor 90. By closing the switch 82 after starting the direct current generator 55, the handle 215, if desired, can be manipulated for striking the arc at 2 in the customary manner.

There is provided a second circuit including the generator 55, conductors 84 and 85, switch 82, conductor 86, resistance 224, conductor 226, the terminals 227 and 228 of a coil or solenoid 229, and conductor 87. Coils or solenoids 217 and 229 differ from one another in that the latter consists of a great number of turns of fine insulated copper wire, whereas the former, that is coil 17, consists of a few turns of heavy insulated copper wire. Both coils are hollow and provide the bores 230 and 231 for reception of longitudinal armatures or cores 232 and 233, respectively. The armatures are pivotally mounted, as at 234 and 235, at the opposite ends of a rocking beam or support 236 which is pivoted at 237 upon an inclined or vertical standard 238. The standard or beam support may be mounted upon the same base 239 which supports the coils 217 and 229. To assist in securing a balancing of the beam 236, there is provided, preferably though not necessarily, any suitable adjusting means for the above purpose. By way of example, the standard may have pivoted thereto at 241 an arm 240, one end of which arm supports the sliding weight 242 and the other end of which arm is pivoted at 243 upon one of the armatures, such as 232. By sliding the weight 243, a balancing of the beam 236 may readily be effected.

The remainder of the mechanism on the beam 236 constitutes a reversing switch for reversing the direction of rotation of the arc adjusting motor 53, according as the beam is tilted in one direction or the other as the current in the arc circuit varies.

Although various types of reversing switches are applicable to the invention, the switch about to be described is found to be satisfactory in its operation. Said switch comprises a pair of closed tubes 244 and 245 each of which contains a quantity of mercury or other suitable electricity conducting material that may shift to one end or the other of the tubes, upon tilting of the tubes. The tubes are mounted on individual clips or supports 246 which are secured adjustably upon brackets 247 fixed to opposite sides of the beam. The clips may include screw studs 248 which pass through the brackets and are held thereto by means of nuts 249. The levels of the tubes thereby may be adjusted so as to assume an exactly horizontal position when the beam is balanced. Each tube has two interiorly disposed conductor points in each of its ends, as indicated clearly in Fig. 5, and when the tubes are level or horizontal the points are free of contact with the mercury. Upon tilting of the tubes in unison, the mercury moves to corresponding ends of the tubes for making electrical connections between the motor and the source of electricity, i. e., the generator 55, or other power supply. When the tubes are tilted in one direction, the motor 53 rotates counter-clockwise, whereas if the tubes are tilted in the opposite direction, the rotation of the motor is reversed, with the result that the carbons are moved toward or from one another.

The field terminals of motor 53 are marked "F", and the armature terminals are marked "E". One pair of the field terminals is connected to the source of electricity by the conductors 250 and 251; the other field terminals are connected to the contacts on the mercury tubes, as are also the armature terminals. Conductors 252, 253 and 254 connect one field terminal with the opposite outermost contacts 255 and 256 of the tubes 244 and 245, and conductors 257, 258 and 259 connect the remaining field terminal with the contacts 260 and 261. One armature terminal is connected with the two inner contacts of tube 244 by means of the conductors 262, 263, 264, while the other is connected to the two inner contacts of tube 245 by means of the conductors 265, 266 and 267.

The foregoing mode of wiring is for use with a six-lead series direct current motor such as 53, it being readily evident that other types of reversible motors would require different modes of wiring.

The operation of the arc starting and stabilizing device is as follows:

With the generator 55 in operation, and upon closing of the switch 82, the conductors 250 and 251 are charged with electricity for exciting the field of the arc-controlling motor 53. At the same time, current flows through the circuit comprising conductors 84, 85, 82, 86, 224, 226, 227, 228, 87 and 55, whereupon the solenoid 229 is energized for drawing downwardly the armature 233 thereof. This movement of the armature causes tilting of the beam 236, which in turn tilts the mercury tubes and furnishes electrical current conductivity in one direction through the motor by means of the wires 257—258—264—262 and 265—267—254—252, whereby the motor is actuated for advancing the carbon elements. Then, as the carbons advance, an arc is formed and current is caused to flow through the circuit comprising the conductors 207, 90, 217, 218, 87, 55, 84, 85, 82, 86, 224 and 206. The solenoid 217, being thereby energized, attracts the armature 232 and moves it downwardly until the pull of the solenoid 229 is equal to that of solenoid 217, whereupon the beam 236 will be balanced and motor 53 stopped for lack of electrical connections within the mercury tubes. Thus it is apparent that the arc is self starting.

As the carbons gradually wear away, the resistance in their circuit increases, with the result that solenoid 217 loses some of its attractive power and permits solenoid 229 to attract its armature and tilt the beam 236 sufficiently to again effect a closing of the motor circuit through the mercury switches. The motor thereupon again advances the carbons, and this operation is repeated until the carbons finally are consumed.

If, during operation of the arc light, some other electrical device is thrown into circuit with the generator so as to draw considerable current therefrom, the arc light will not be extinguished, but instead, the solenoid 217 will lose some of its attractive force and permit the solenoid 229 to act for tilting the mercury switches and effecting an advancement of the carbons by the motor 53. Should said other electrical device thereafter be cut out of the circuit or caused to decrease its drain on the generator, the solenoid 217 will regain its attractive force and overcome the force of the solenoid 229, whereby to effect another actuation of the motor for spacing the carbons properly under the new conditions thereby presented. Thus it will be evident that the arc light automatically is adjusted and readjusted to render it properly operative regardless of fluctuations or variations in the arc light circuit however extreme they may be.

By virtue of the means above described, one may either advance or retract the carbons manually, by means of the handle 215, with the result that the motor 53 will become energized for immediately moving the carbons to the predetermined properly spaced relationship as determined by the relative attractive efforts of the solenoids. As an example providing assistance for properly constructing the device, it may be stated that in using a direct current generator of 70 volts E. M. F., the solenoid 229 may comprise approximately 7200 turns of No. .012 insulated copper wire, and the solenoid 217 may comprise 69 turns or less of No. 10 insulated copper wire. Solenoid 217 by reason of its construction and manner of connection in the arc circuit, may be termed a series coil or solenoid, and that indicated at 229 is a potential coil or solenoid. The series coil is seen to be in series with the arc, while the potential coil is connected in the arc circuit, shunted across the arc and the series coil. The attractive strength of the potential coil 229 remains nearly constant at all times, but the series coil 217 being in series with the arc and having but few turns of heavy wire, is considerably affected by variations in the arc circuit.

The friction means 214 may be of any accepted construction there being shown herein a snugly fitting friction sleeve 290 on the shaft 212, which sleeve has keyed thereto at 271 the worm wheel 272 which meshes with worm 273 on the shaft of motor 53. To preclude movement of the sleeve longitudinally of the shaft 212, said shaft may be provided with an annular groove 274 engaged by a pin 275 in the sleeve (Fig. 7).

It will readily be apparent to those skilled in the art, that the type of generator 55 and arcing elements used in the combination, will determine to a great extent the number of turns of wire to be placed on the solenoids 217 and 229. The mode of wiring the motor 53 with the reversing switch will of course depend upon the construction of the motor and the kind of current used to operate it.

It may be stated, incidentally, that by keeping the bearings 276 or other parts of the mechanism in a tightened condition, a braking of the motor may be secured; however, if all the parts are permitted to operate freely the sensitivity of the device is increased due to more frequent actuations of the reversing switch and motor 53 resulting from the tendency of the motor to coast after each energization thereof.

From the foregoing, it will be obvious that I have provided means whereby the operation of the motion picture projecting machines is rendered entirely automatic, it being thereby unnecessary for the operator to utilize his time watching for cues on the projected picture and to manually place one machine in operation after termination of the exhibition by the first machine. The operator is required only to thread the film through the machines, leaving the automatic change-over to be accomplished by the automatic mechanisms whereby change-overs are made in such manner as to be imperceptible to the audience. As a result, the entire exhibition of pictures with sound is rendered absolutely perfect and continuous, which was practically impossible when the machines were changed over manually.

Although I illustrated and described herein, the preferred manner of accomplishing the foregoing, it is to be understood that various modifications and changes in structural details may be made, within the scope of the claims, without departing from the spirit of the invention.

What I claim is:

1. The combination with a plurality of motion picture projecting machines each comprising a pair of film transferring reels, an illuminator for the film and a motor for moving the film from one reel to the other at a uniform rate of speed past the illuminator, of means including a governor switch driven by one of the reels upon movement of the film from one reel to the other, for initiating operation of the machines in succession.

2. The combination with a plurality of motion picture projecting machines each comprising a pair of film transferring reels, an illuminator, and means for moving the film past the illuminator from one reel to the other, of means responsive to variations in the speed of rotation of one of the reels, as its hub diameter changes due to winding or unwinding of the film, for initiating operation of the machines in succession.

3. The combination of a plurality of motion picture projection machines each comprising a pair of film transferring reels, an illuminator, and a motor for unwinding the film from one of the reels to the other and moving it progressively past the illuminator, a shutter on each machine for intercepting the light rays of the illuminators, means associated with both shutters for closing one shutter while opening the other shutter, a sound producing apparatus to be selectively connected with the machines, means associating the shutter mechanism with the sound producing apparatus to connect the sound producing apparatus with that machine whose shutter is open and means responsive to variations in the speed of rotation of one of the reels, as its hub diameter changes due to winding or unwinding of the film, for initiating operation of the machines in succession.

4. In combination a pair of motion picture projecting machines each comprising a pair of film transferring reels, a light source, a motor for unwinding the film from one of the reels and moving it progressively past the light source, a movable change-over control member provided with means for advancing said member progressively as the film is unwound from the reel of the machine, a safety cut-off switch and a douser, a series of electro-magnetic contactors each having a throw-in and a throw-out coil, an electrical circuit including a source of electricity, the light sources and a pair of said contactors, a second electrical circuit including a source of electricity and two pairs of said contactors for the motors and dousers of both machines, a third electrical circuit including a source of electricity, the safety cut-off switches, the change-over control members, the magnetic coils of the contactors, and a series of manually operable switches for manual control of the machine elements, the aforesaid advancement of the change-over control member of one machine thereby serving to successively close the electrical circuits of the magnetic units of the contactors which include the light source, motor, and douser of the other machine, for closing the said first and second electrical circuits, means associated with the safety cut-off switch for actuation thereof upon predetermined unwinding of the films from the reels, said actuation of the cut-off switch operating to close the circuit through magnetic throw-out coils of the contactors of the first and second circuits, to open the circuits of the light source and motor of the machine carrying said safety cut-off switch.

5. In combination a pair of motion picture projecting machines each comprising a pay out and a receiving film transferring reel, a light source, a motor for unwinding the film from one of the reels and moving it progressively past the light source, a movable change-over control member provided with means for advancing said member progressively as the film is unwound from the pay out reel, a safety cut-off switch and a douser, a series of electromagnetic contactors each having a throw-in and a throw-out coil, an electrical circuit including a source of electricity, the light sources and a pair of said contactors, a second electrical circuit including a source of electricity and two pairs of said contactors for the motors and dousers of both machines, a third electrical circuit including a source of electricity, the cut-off switches, the change-over control members and the magnetic coils of the contactors, the aforesaid advancement of the change-over control member of one machine thereby serving, upon predetermined movement, to successively close the electrical circuits of the magnetic units of the contactors which include the light source, motor, and douser of the other machine, for closing said first and second electrical circuits, means associated with the cut-off switch for actuation thereof upon predetermined unwinding of the films from the pay out reels, said actuation of the cut-off switch operating to close the circuit through the magnetic throw-out coils of the contactors of the first and second circuits, to open the circuits of the light source and motor of the machine carrying said safety cut-off switch.

6. The combination with a plurality of motion picture projecting machines each comprising movable film supporting means constituted of a film pay-out and a film receiving element, a light source, a motor for moving the payed-out film past the light source, a douser, and sound producing means to be connected with a speaker, of means associated with one of the machines and normally held in an operative position for maintaining its light source and motor in operation, said means being rendered inoperative when the film has been completely payed out, a similar normally operative maintaining means associated with the other machine, mechanism associated with the first machine and including means controlled by movement of the film supporting means thereof for placing in operation the light source and motor of the other machine, a similar mechanism associated with said other machine, for placing in operation the light source and motor of the first machine, means operating to open the douser of one machine and close that of the other machine, connections between said mechanisms, maintaining means, and machine constituents, whereby each machine may stop itself and start the other automatically, and means associated with the dousers to connect the sound producing means alternately with a speaker.

7. In combination with a motion picture projecting machine comprising at least one rotatable transfer reel for spirally wound film, an illuminator for the film, and means for transferring the film relative to the reel and moving the film at a substantially uniform rate of speed past the illuminator as the reel rotates at an ever-changing speed due to the transfer and the resultant change in the effective hub diameter of the reel, which hub diameter is constituted chiefly of the spirally wound film, an electrical circuit, an arc light and a source of electricity included in the electrical circuit, and means responsive to the variation of reel speed for closing the arc light circuit and effecting energization of said arc light.

HENRY G. WEISS.